United States Patent
Strothmann

(10) Patent No.: US 7,321,176 B2
(45) Date of Patent: Jan. 22, 2008

(54) MULTI POLE ELECTRICAL MACHINE WITH REDUCED COGGING FORCE

(75) Inventor: Thomas Strothmann, Wallenhorst (DE)

(73) Assignee: Invacare Corporation, Elyria, OH (US)

(*) Notice: Subject to any disclaimer, the term of this patent is extended or adjusted under 35 U.S.C. 154(b) by 512 days.

(21) Appl. No.: 10/225,469

(22) Filed: Aug. 21, 2002

(65) Prior Publication Data
US 2003/0038557 A1 Feb. 27, 2003

Related U.S. Application Data

(63) Continuation of application No. 09/553,522, filed on Apr. 20, 2000, now abandoned.

(51) Int. Cl.
*H02K 21/12* (2006.01)

(52) U.S. Cl. ............... 310/156.15; 310/156.36; 310/216

(58) Field of Classification Search .................
310/156.12–156.15, 156.26, 156.36, 156.37,
310/216–218, 254, 261, 152
See application file for complete search history.

(56) References Cited

U.S. PATENT DOCUMENTS

| 239,289 | A | | 3/1881 | Woolley |
| 519,097 | A | | 5/1894 | Schmid |
| 4,190,779 | A | | 2/1980 | Schaeffer |
| 4,315,171 | A | | 2/1982 | Schaeffer ............... 310/49 |
| 4,424,463 | A | | 1/1984 | Musil |
| 4,774,428 | A | * | 9/1988 | Konecny ............... 310/198 |
| 4,968,911 | A | | 11/1990 | Denk ................... 310/42 |
| 5,006,745 | A | * | 4/1991 | Nishio et al. ........... 310/177 |
| 5,015,903 | A | | 5/1991 | Hancock et al. ......... 310/168 |
| 5,164,622 | A | * | 11/1992 | Kordik ................. 310/67 R |
| 5,442,250 | A | | 8/1995 | Stridsberg |
| 5,554,902 | A | | 9/1996 | Kessens et al. .......... 310/254 |
| 5,592,731 | A | | 1/1997 | Huang et al. ............ 29/596 |

(Continued)

FOREIGN PATENT DOCUMENTS

EP  0 291 219  5/1988

(Continued)

OTHER PUBLICATIONS

European Search Report EP 0 996 217 A1, Publication Date Apr. 26, 2000, 2 pages.

(Continued)

*Primary Examiner*—Dang Le
(74) *Attorney, Agent, or Firm*—Calfee, Halter & Griswold LLP

(57) ABSTRACT

A multi pole electrical machine includes an armature and a stator. The armature is movable in a direction of armature motion with regard to said stator and includes armature pole pairs. These armature pole pairs follow each other in the direction of armature motion. Each armature pole pair corresponds to one magnetic period. The stator includes a differing fixed number of stator poles per armature pole pair to reduce a cogging force of the electrical machine. An arrangement of the stator poles, with regard to both electrical and magnetic aspects, includes at least two identical sub-arrangements of stator poles. These sub-arrangements of stator poles follow each other in the direction of armature motion. Each of the sub-arrangements of stator poles is associated with one or more armature pole pairs and includes more than three of stator poles.

12 Claims, 9 Drawing Sheets

U.S. PATENT DOCUMENTS

| | | | |
|---|---|---|---|
| 5,610,464 A | 3/1997 | Asano et al. | 310/156 |
| 5,973,431 A | 10/1999 | Li et al. | 310/168 |
| 6,093,984 A * | 7/2000 | Shiga et al. | 310/26 |
| 6,242,822 B1 | 6/2001 | Strothmann et al. | 310/12 |
| 6,265,804 B1 | 7/2001 | Nitta et al. | 310/259 |
| 6,492,756 B1 * | 12/2002 | Maslov et al. | 310/156.12 |

FOREIGN PATENT DOCUMENTS

EP  0 678 968  10/1991

OTHER PUBLICATIONS

Patent Abstract of Japan, Publication No. 0328148; Publication Date Dec. 13, 1991; title "Synchronous Motor," 1 page.

* cited by examiner

MULTI POLE ELECTRICAL MACHINE WITH REDUCED COGGING FORCE

CROSS REFERENCES TO RELATED APPLICATIONS

This patent application is a continuation of application Ser. No. 09/553,522, filed Apr. 20, 2000, now abandoned and titled "Multi Pole Electrical Machine With Reduced Cogging Force."

FIELD OF THE INVENTION

This invention relates in general to multi pole electrical machines with reduced cogging torque. More particularly, this invention relates to multi pole electrical machines, the electrical machines including an armature and a stator; said armature being movable in a direction of armature motion with regard to said stator, said armature including an integer number of armature pole pairs, said armature pole pairs following each other in the direction of armature motion, and each of said armature pole pairs corresponding to one magnetic period; said stator including a fixed number of stator poles per armature pole pair, the number of stator poles per armature pole pair differing from an integer number to reduce a cogging force of the electrical machines.

BACKGROUND OF THE INVENTION

In electrical machines with externally or permanently excited armature, the armature, which can, for example, be a rotor of a rotary electrical machine, includes a number of separate armature poles or rotor poles, which alternately form a magnetic north pole and then, following in the direction of armature motion, a magnetic south pole. Two successive armature poles, which form a magnetic north pole and a magnetic south pole and thus a full magnetic period, will also be called an armature pole pair herein.

Particularly, if the number of stator poles per magnetic period of the armature, i.e. per armature pole pair, is an integer number, and if the stator poles, at any time, show a complete and identical arrangement of the stators poles associated to each armature pole pair, a so-called cogging force occurs in the electrical machine. This cogging force is based on non-linear variations of the forces put on the stator poles and caused by the armature poles, which depend on the total of the existing magnetic fields between the armature poles and the stator poles. Non-linear magnetic field portions, which finally lead to the non-linear variations of the force in the electric machine, exist due to the essential gaps between the armature poles, which are in magnetic respect also always generated by leakage flux. From a rotary electrical machine's point of view, these initial radial variations of the force will then be transformed into a tangential force by means of the motion of the armature. In this way the disadvantageous cogging force is generated, which is particularly typical for slow idle motion. Cogging force is also known under the terms "intrinsic cogging performance" and "cogging". Additionally, the effects described here add up over the total length of the armature, because of the consistent conditions within each single magnetic periods of the armature. The results are uneven running, the necessity of adhering to minimum speed, undesired noise, vibrations etc.

It is typical to use a special geometric design of the stator poles or of the armature poles or of their arrangement with regard to each other in order to reduce the cogging force in electrical machines. Such an approach is described in DE 195 07 490 C2. It turns out, however, that this approach is very costly and that it usually has a negative impact on the efficiency of the electrical machine.

It is known from DE 41 33 723 A1, where a three-phase electrical machine is concerned, that one armature pole pair is assigned to the integer number of three stator poles, as it is common. However, the cogging forces of the single stator poles are displaced to each other by different distances between the armature poles, which has the result of a kind of averaging of the cogging forces over the whole armature instead of an addition. The disadvantage here is that the actual described three-phase electrical machine can only be used for a very narrow range of operation parameters. Furthermore, the non-equidistant arrangement of the armature poles excludes the use of the so-called Hall element-effect devices as rotor position detectors, which is very common in electronically commuted machines, because the non-equidistant arrangement of the armature poles causes a big angular jitter during the position detection of the armature field.

A first electrical machine of the particular type described at the beginning is known from EP 0 291 219 A1. A difference between the total number of stator poles from the total number of rotor poles with a value of ±1 is intended here. In this way, the cogging forces shall be averaged out over the whole armature. However, especially in case of a high number of poles, it turns out that the averaging of the cogging forces put on the poles no longer completely occurs, because mechanical deformations of the armature or the stator, which may be caused by manufacture or load, or interferences in the equidistance of the armature poles or an eccentricity of the stator or the rotor in the electrical rotary machine emphasize the cogging forces in single areas of the armature, which can no longer be compensated completely through the opposing cogging forces in other areas of the armature. Eccentricities of the rotor or the stator, wobbling of the rotor and faulty allocations of the permanent magnets of a permanently excited rotor lead to an undesired intensity of clearly visible cogging torque especially in rotary electrical machines. A relatively high noise level is produced too, which is caused by the characteristic distribution of the cogging forces in the electrical rotary machine and by a basic harmonic vibration frequency of the electrical machine with regard to the entire machine surroundings.

Another electrical machine of the particular type described at the beginning is known from DE 195 11 434 A1. Here, the number of stator poles per armature pole pair shall differ from an integer number. This approach is also used by the design for an electrical machine where the total number of armature poles and the total number of stator poles differs more than ±1 from each other. The necessary winding arrangement of the stator for this is complex and thus difficult to achieve manually as well as mechanically. Moreover, the still existing cogging force, caused, for example, through eccentricities of the rotor or the stator of a rotary electrical machine and similar defects, can be accented in partial areas of the electrical machine in such a way that they cannot be averaged out completely over the entire electrical machine, but result in a distinct total cogging torque.

It is known from WO 94/06192 to construct the stator of an electrical machine using several identical stator segments. The stator segments will be equipped with a shared winding, i.e. a winding, which extends over the single segments. This shared winding can be formed, while the stator segments are still in a one level arrangement side by side and are not yet assembled in the form of a ring-shaped stator. WO 94/06192 does not look onto the reduction of the cogging forces of the electrical machine described there. The stator segments are not manufactured separately from each other with regard to their winding and thus with regard to their electrical and magnetic formation.

Thus, it is a problem to be solved by the invention to provide an electrical machine of the particular type described at the beginning, which does not show a considerable increase in cogging forces, even if mechanical deviations exist, that are caused by manufacture or load. A further problem to be solved by the invention at the same time is to keep the production process for the electrical machine as simple as possible.

SUMMARY OF THE INVENTION

Briefly described, the present invention provides a multi pole electrical machine, the electrical machine including an armature and a stator; said armature being movable in a direction of armature motion with regard to said stator, said armature including an integer number of armature pole pairs, said armature pole pairs following each other in the direction of armature motion, and each of said armature pole pairs corresponding to one magnetic period; said stator including a fixed number of stator poles per armature pole pair, the number of stator poles per armature pole pair differing from an integer number to reduce a cogging force of the electrical machine; wherein an arrangement of all of said stator poles, with regard to both electrical and magnetic aspects, consists of a least two identical sub-arrangements of said stator poles, said sub-arrangements of stator poles following each other in the direction of armature motion, each of said sub-arrangements of stator poles being associated to an integer number of said armature pole pairs and including more than three of said stator poles.

The reduction of the total cogging force in the new electrical machine is not performed by averaging out local cogging forces over the entire length of the armature, which corresponds to the circumference of the rotor and also to the circumference of the stator in a rotary electrical machine. Rather, averaging out of the cogging forces down to an infinitesimal or at least considerably reduced rest occurs within the area around each arrangement of the stator poles. Compared to a "state of the art" electrical machine with the same number of stator poles, the reduction of the cogging forces also occurs over a lower number of stator poles in this way. There is no danger that incorrect local arrangement of the armature poles, armature or stator deformations or eccentricities between the stator and the rotor in a rotary electrical machine accentuate single cogging forces so strongly, that they lead to a considerable resulting total cogging force with regard to the entire electrical machine. Rather, the local cogging forces may only be accentuated with regard to an entire sub-arrangement of stator poles, over which, however, the cogging forces will already be internally compensated.

If the stator consists of at least two identical stator segments manufactured separately from each other, each of which includes one sub-arrangement of stator poles or several complete sub-arrangements of stator poles, then the stator is not only divided with regard to electrical and magnetic aspects into the sub-arrangements of stator poles. Rather, the stator is mechanically constructed from single stator segments and can be produced in this way. This means considerably easier fabrication, especially of big electrical machines and electrical machines with a very high number of poles.

For reasons of symmetry it is advantageous for the construction of the new electrical machine, if every stator segment has a number of stator poles, which is equal to an integer multiple of a number of operating phases of the electrical machine. If every stator segment consists of exactly one sub-arrangement of stator poles, this means, that every sub-arrangement of stator poles also has a number of stator poles, which is equal to an integer multiple of the number of operating phases of the electrical machine.

In the same way as the stator, the armature of the new machine can also be composed of at least two identical armature segments manufactured separately from each other, each of which has an integer number of armature pole pairs to which one sub-arrangement of stator poles or several complete sub-arrangements of stator poles correspond.

For the production of the stator segments, and if necessary of the armature segments too, pre-fabricated coils can be used. Prerequisite for this is the fabrication of the pole heads in a shape which allows to plug-in the pre-fabricated coils. The use of pre-fabricated coils wound on bobbins increases both the mechanical stability of the coils and the dielectric strength of the windings. The amount of copper, i.e. windings in the stator or armature segments can be made quite high by means of pre-fabricated coils. This is the case, however, especially with pre-fabricated coils without bobbins.

The new electrical machine may have a winding system in every sub-arrangement of stator poles, the winding systems of all sub-arrangements of stator poles being connected with each other to an overall winding of the stators by parallel connection, or alternatively by series connection.

The connection scheme for the sub-arrangement of stator poles or the stator pole segments, respectively, in parallel connection or series connection or in a combination of these two combinations allows a variation of the connecting values of the new electrical machine with regard to their operating voltage and their operating current, i.e. their supply impedance, without the necessity for a use of unfavourable, i.e. extraordinarily thick or thin, wires for the overall winding of the machine.

The design of the stator consisting of single identical stator segments results in that there is no deviation over the segments between the phases corresponding to each other. This is, for example a direct prerequisite for a parallel connection but also for a good efficiency of the new electrical machine.

The number of sub-arrangements of stator poles in the stator pole arrangement of the new electrical machine should be between 2 and 6 taking into consideration the simplicity of construction of the stator, on the one hand, and the decreasing amount of additional reduction of the total resulting cogging force by each additional sub-arrangement even under unfavourable conditions of production and operation, on the other hand. In terms of the second criterion the number of only two sub-arrangements of stator poles is already just a compromise.

With reference to FIG. 4, an exemplary embodiment of an electrical machine 1 constructed as a rotary machine includes a rotor or armature 3 and a stator 2. In the embodiment being described the stator 2 includes two stator pole sub-arrangements 8 that divide electrical and magnetic aspects of the stator 2. The stator 2 may also be divided mechanically into two stator segments 9 in relation to the two stator pole sub-arrangements 8. The rotor or armature 3 may optionally be formed by two rotor or armature segments 10 corresponding to the two stator segments.

With reference to FIG. 5, an exemplary embodiment of an electrical machine 1 constructed as a rotary machine includes a rotor or armature 3 and a stator 2. In the embodiment being described the stator 2 includes three stator pole sub-arrangements 8 that divide electrical and magnetic aspects of the stator 2. The stator 2 may also be divided mechanically into three stator segments 9 in relation to the three stator pole sub-arrangements 8. The rotor or armature 3 may optionally be formed by three rotor or armature segments 10 corresponding to the three stator segments.

With reference to FIG. 6, an exemplary embodiment of an electrical machine 1 constructed as a rotary machine includes a rotor or armature 3 and a stator 2. In the embodiment being described the stator 2 includes four stator pole sub-arrangements 8 that divide electrical and magnetic aspects of the stator 2. The stator 2 may also be divided mechanically into four stator segments 9 in relation to the four stator pole sub-arrangements 8. The rotor or armature 3 may optionally be formed by four rotor or armature segments 10 corresponding to the four stator segments.

With reference to FIG. 7, an exemplary embodiment of an electrical machine 1 constructed as a rotary machine includes a rotor or armature 3 and a stator 2. In the embodiment being described the stator 2 includes five stator pole sub-arrangements 8 that divide electrical and magnetic aspects of the stator 2. The stator 2 may also be divided mechanically into five stator segments 9 in relation to the five stator pole sub-arrangements 8. The rotor or armature 3 may optionally be formed by five rotor or armature segments 10 corresponding to the five stator segments.

With reference to FIG. 8, an exemplary embodiment of an electrical machine 1 constructed as a rotary machine includes a rotor or armature 3 and a stator 2. In the embodiment being described the stator 2 includes six stator pole sub-arrangements 8 that divide electrical and magnetic aspects of the stator 2. The stator 2 may also be divided mechanically into six stator segments 9 in relation to the six stator pole sub-arrangements 8. The rotor or armature 3 may optionally be formed by six rotor or armature segments 10 corresponding to the six stator segments.

In the following, the invention will be explained and described in more detail by means of preferred embodiments.

DETAILED DESCRIPTION

Figure 1A:
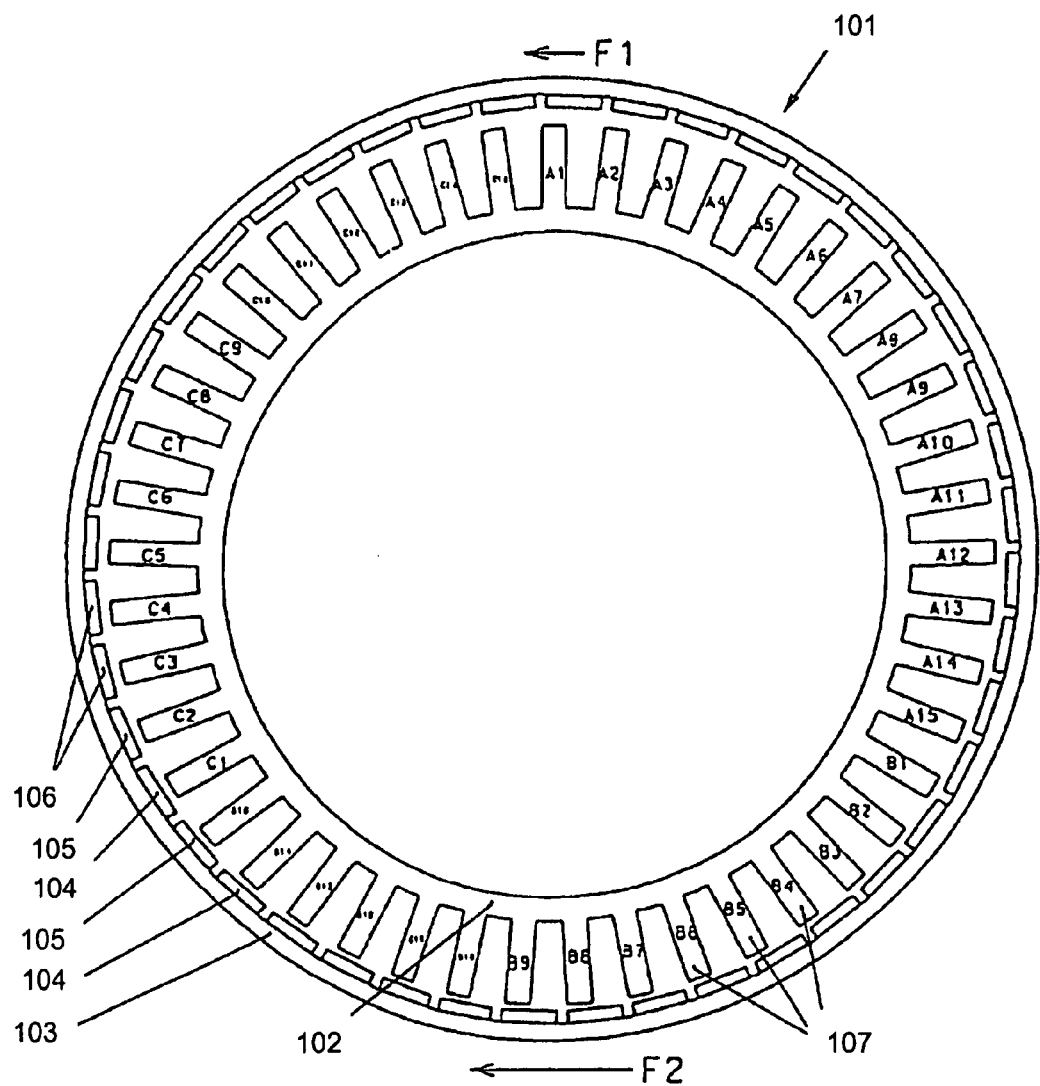
FIG. 1a illustrates the construction of a rotary electrical machine according to EP 0 291 219 A1 assuming an offset of the center points of stator and rotor as well as of a determined rotor position.
Figure 1B:
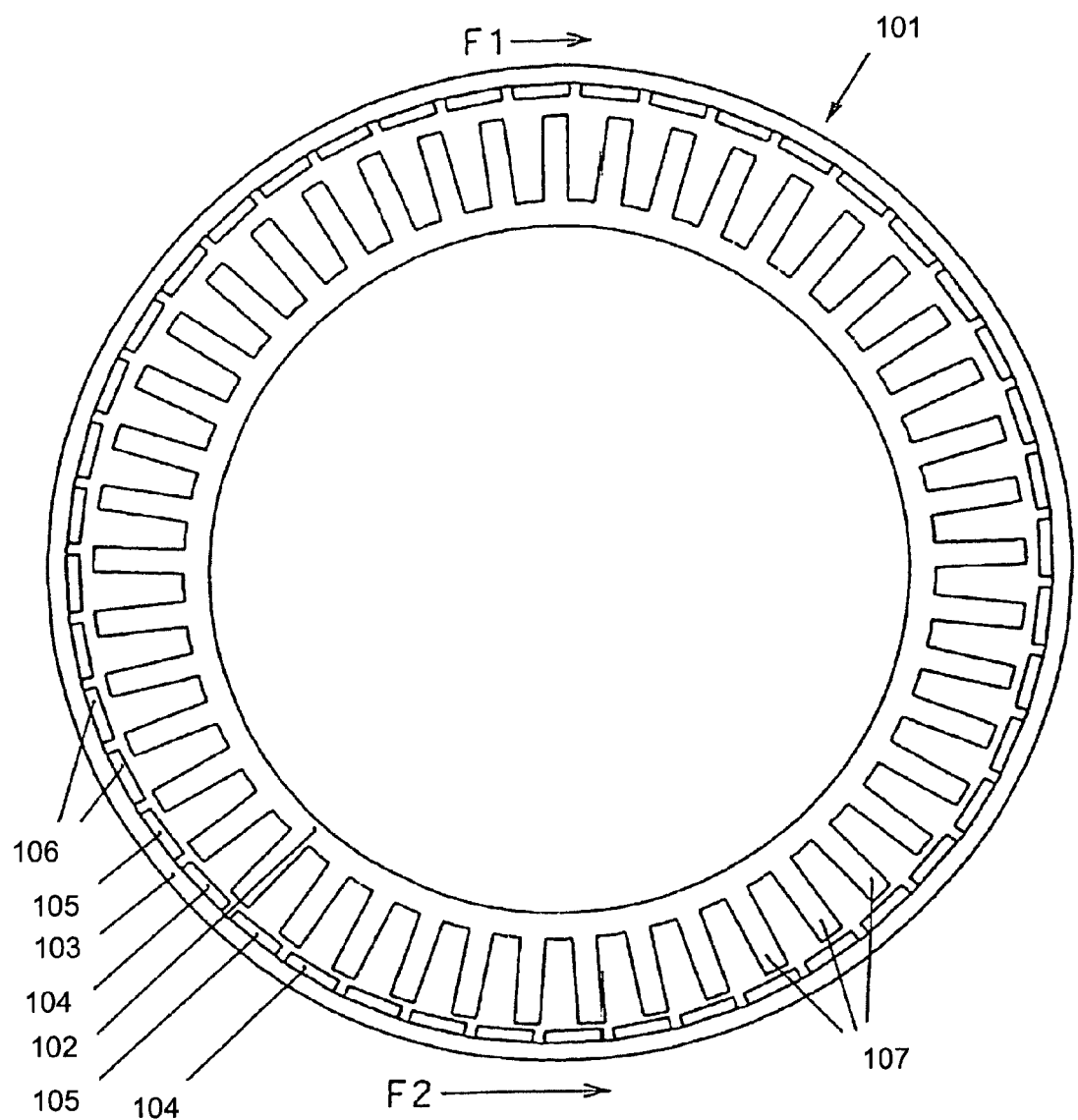
FIG. 1b shows the machine according to FIG. 1a after slightly turning the rotor.

FIGS. 1a and 1b illustrate a state of the art electrical machine 101 which is constructed as a rotary machine. The electrical machine 101 has an internal stator 102 and an external armature 103 which surrounds the stator 102 and which can also be called rotor in this case of a rotary machine. Armature 103 is permanently excited by means of permanent magnets 106. In this present case, armature 103 has an armature pole arrangement, in which magnetic south poles 104 and magnetic north poles 105 alternate and in which each time one south pole 104 and one north pole 105 form one armature pole pair 104, 105 corresponding to an entire magnetic period. Stator 102 of electrical machine 101 is designed for a three-phase electrical machine in a three-phase network with the phases U, V and W. The stator poles 107 are marked accordingly in the same way as in EP 0 291 219 A1, which is incorporated by references here. That means the stator poles 107 designated A1, A3, A5 etc. correspond to clockwise wound pole coils at phase U, i.e. electrically 0°, the stator poles 107 designated A2, A4, A6 etc. correspond to counterclockwise wound pole coils at phase U, i.e. electrically 180°, the stator poles 107 designated B1, B3, B5 etc. correspond to clockwise wound pole coils at phase V, i.e. electrically 120°, the stator poles 107 designated B2, B4, B6 etc. correspond to counterclockwise wound pole coils at phase V, i.e. electrically 300°, the stator poles 107 designated C1, C3, C5 etc. correspond to clockwise wound pole coils at phase W, i.e. electrically 240°, and the stator poles 107 designated B2, B4, B6 etc. correspond to counterclockwise wound pole coils at phase W, i.e. electrically 60°. Specifically, the electrical machine 101 corresponds to the case n=7 according to EP 0 291 219 A1, i.e. it has 3*(2n+1)−1=44 armature poles 104, 105 and 3*(2n+1)=45 stator poles 107. In this way cogging forces will be averaged out between the armature 103 and the stator 102 over the whole circumference of the electrical machine assuming that electrical machine 101 is an ideal electrical machine with co-axial arrangement of stator 102 and armature or rotor 103. However, deformations of stator 102 and of armature 103 as well as eccentricities occur as a matter of fact. This last case is illustrated in FIGS. 1a and 1b in two rotation positions of the armature 103 to stator 102. Local cogging forces generated in the lower part of the machine 101 are stronger than the forces in the upper part, because of the eccentricity between the stator 102 and the armature 103 which results in the air-gaps in the lower part of the electrical machine 101 being smaller than in the upper part. A clockwise torque at armature 103 is generated in this specific case of the relative position of the armature 103 to the stator 102 according to FIG. 1a, whereas a counterclockwise torque exists in the relative position according to FIG. 1b. The direct result of this is an unfavourable cogging torque or cogging force. In bigger electrical machines such a cogging force occurs even without an eccentricity between the armature and the stator. The different forces between the stator and the armature only can lead to a rotating flexible deformation of the electrical machine with basically the same effects as an eccentricity. In this case the strongest forces between the armature and the stator always act where the strongest excited windings are allocated, so that tangential and radial forces act on stator and rotor, which rotate with the feeding frequency, i.e. with the fundamental wave of the electrical machine. A relatively high noise emission can also be detected as a side effect, especially during operation of the electrical machine with frequency inverters that work in the audible frequency range.

Figure 2:
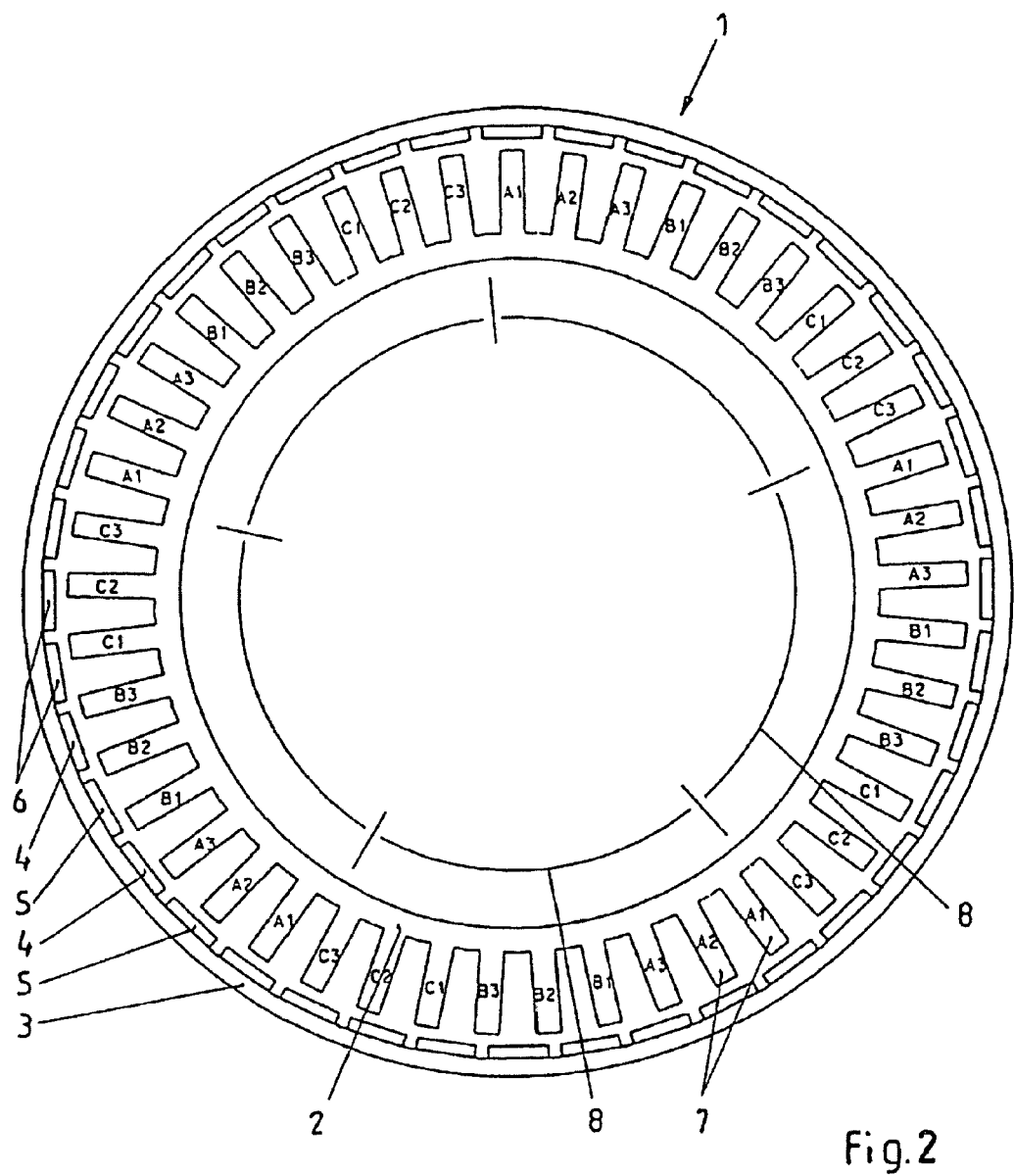
FIG. 2 illustrates a first embodiment of the new electrical machine according to the claimed invention constructed as a rotary machine.

All these disadvantages will be avoided in the new electrical machine, a first embodiment of which is illustrated in FIG. 2. The new electrical machine 1 is characterized here by a dividing up the stator pole arrangement into five identical sub-arrangements of stator poles 8. That means, stator 2 is characterized by a five-fold rotational symmetry with regard to the electrical and magnetic formation of the stator poles 7. The special formation of stator 2 again corresponds to a three-phase electrical machine 1. The markings of the single stator poles 7 in FIG. 2 follow those according to FIG. 1a, i.e. the notation of EP 0 291 219 A1, where the number of ferromagnetic poles (i.e., stator poles) equals 3(2n+1) and the number of permanent magnetic poles (i.e., rotor or armature poles) equals 3(2n+1)±1, where n is an integer of 1 or more (page 3, lines 54-55). The rule set out there concerning the number of armature pole pairs and of the stator poles complies here for each one of the sub-arrangements of stator poles 8 with n=1. Consequently, the stator 2 consists of five equal sub-arrangements of stator poles 8 with each time 3*(2n+1)=9 stator poles 7, i.e. a total of 45 stator poles. On the other hand the armature 3 here consists of five times 3*(2n+1)−1=8, i.e. a total 40 of armature poles 4, 5. Adjacent stator poles 7 are equidistant from each other as are adjacent armature poles 4, 5 of each armature pole pair. Note, however, the distance between adjacent stator poles 7 differs from the distance between adjacent armature poles 4, 5. The magnetic and electrical as well as the general cogging force conditions are identical within every sub-arrangement of stator poles 8. The stator poles 7 of the single sub-arrangements of stator poles 8 with phases corresponding to each other can be connected in parallel connections, series connections as well as combinations of these connections.

Figure 3:
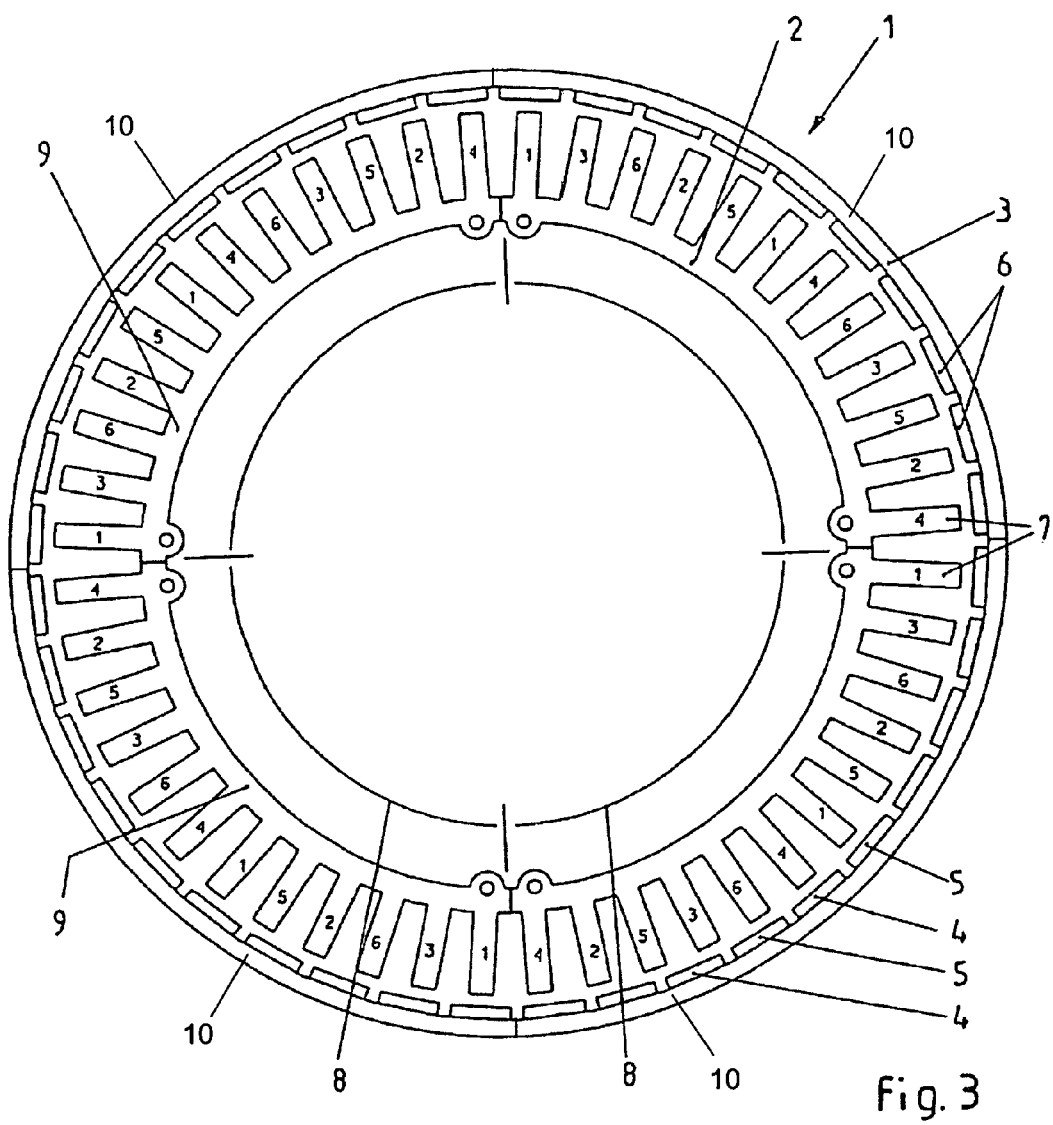
FIG. 3 illustrates a second embodiment of the new electrical machine according to the claimed invention also constructed as a rotary machine.
Figure 4:
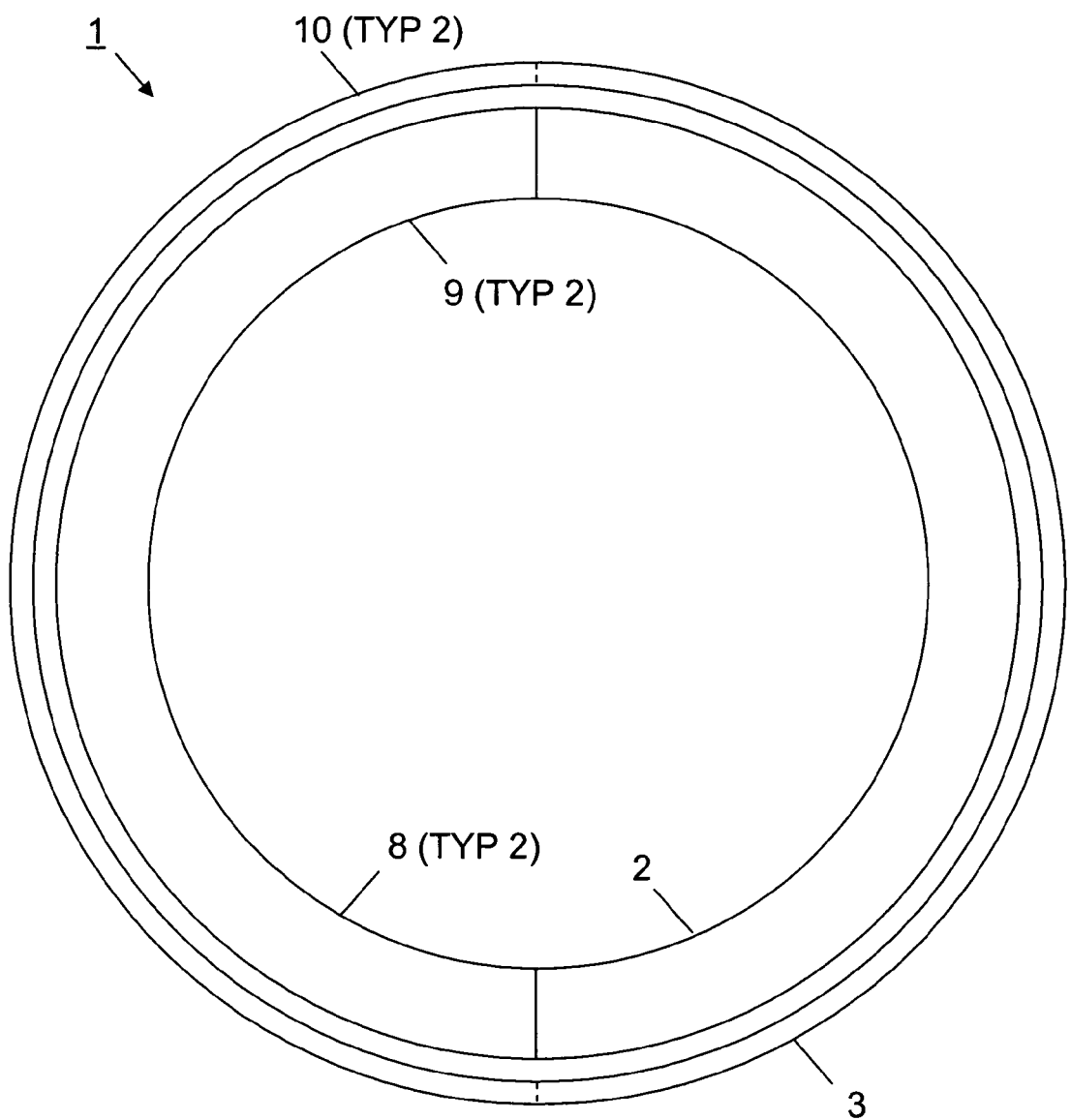
FIG. 4 illustrates an exemplary embodiment of an electrical machine constructed as a rotary machine.
Figure 5:
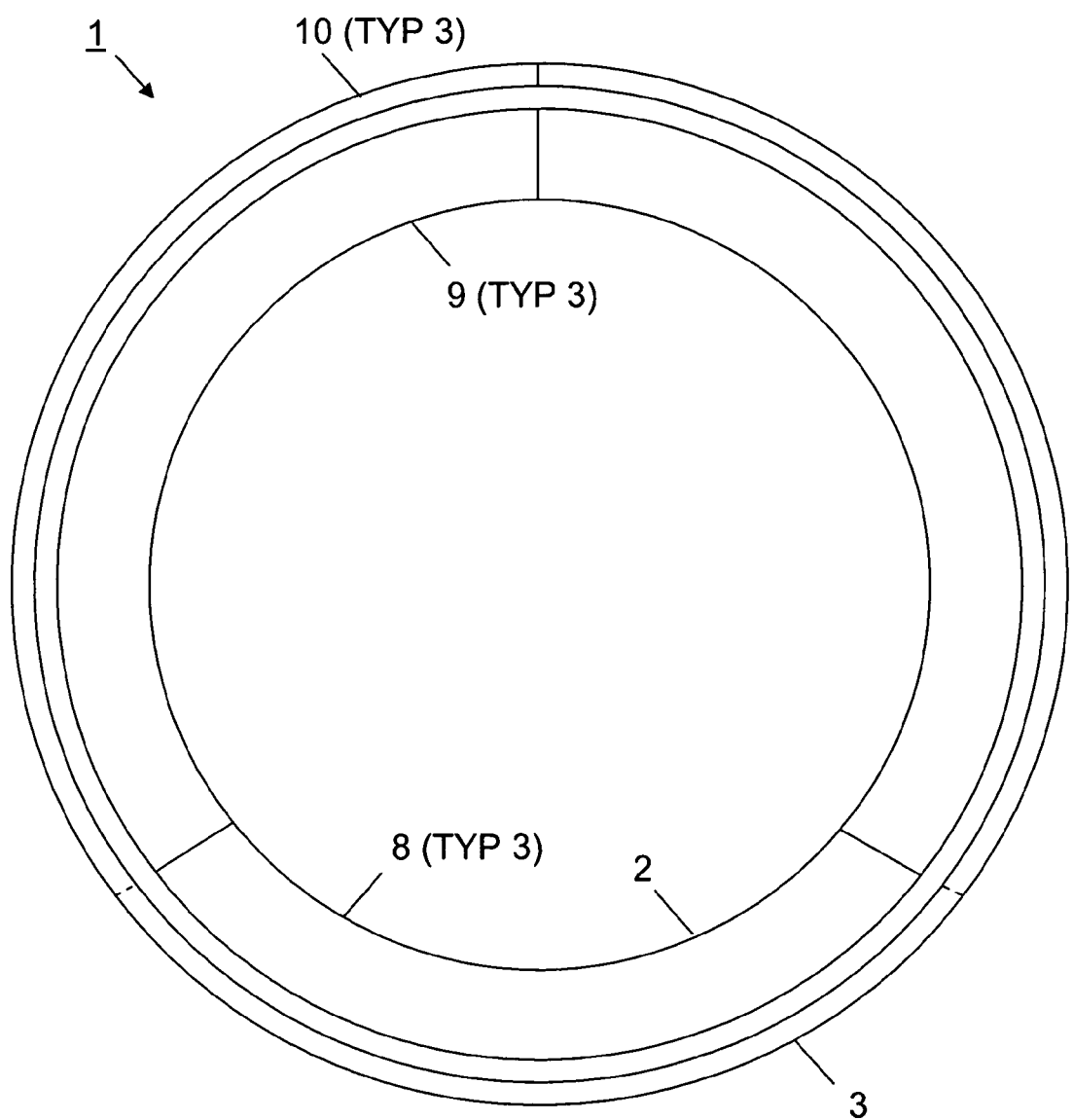
FIG. 5 illustrates another exemplary embodiment of an electrical machine constructed as a rotary machine.
Figure 6:
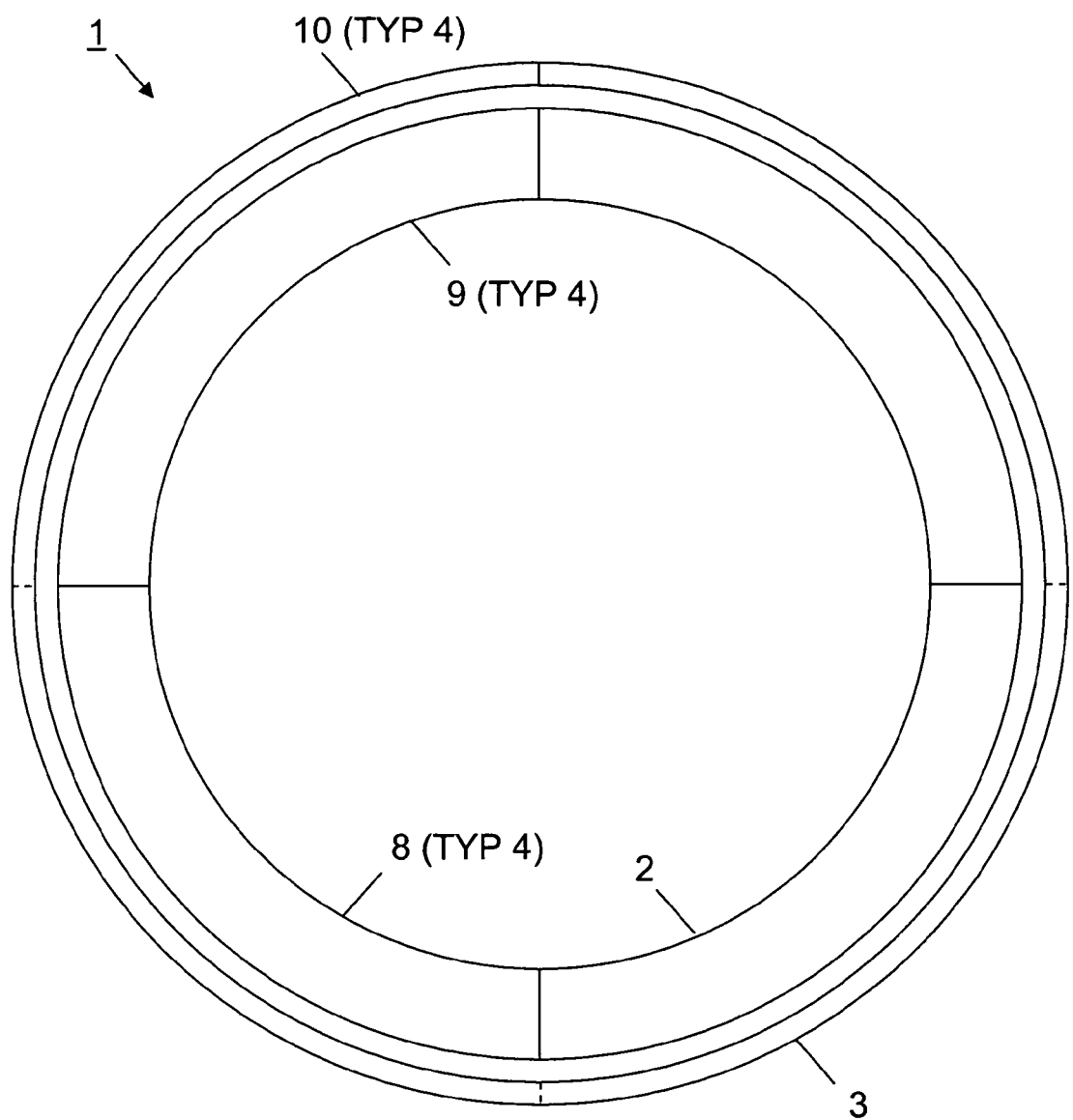
FIG. 6 illustrates yet another exemplary embodiment of an electrical machine constructed as a rotary machine.
Figure 7:
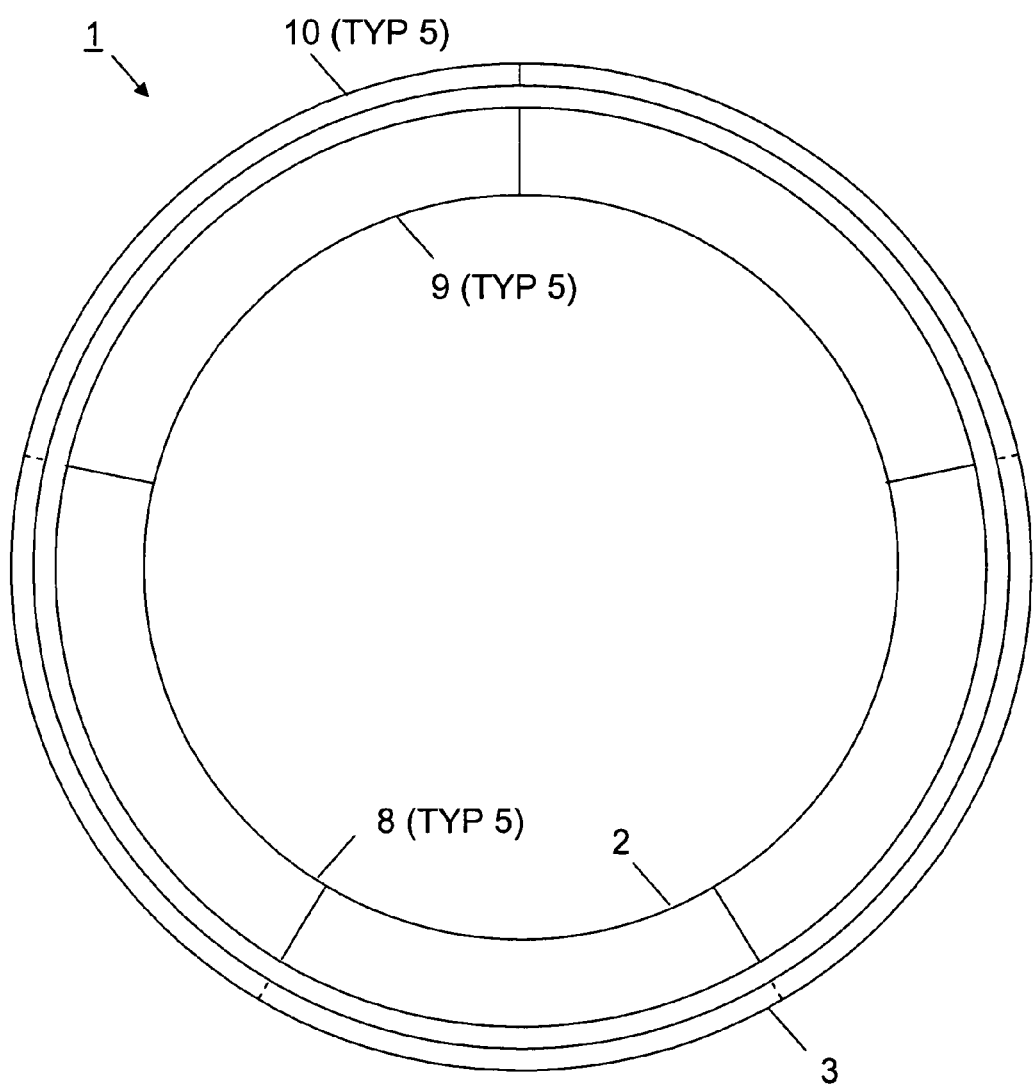
FIG. 7 illustrates still another exemplary embodiment of an electrical machine constructed as a rotary machine.
Figure 8:
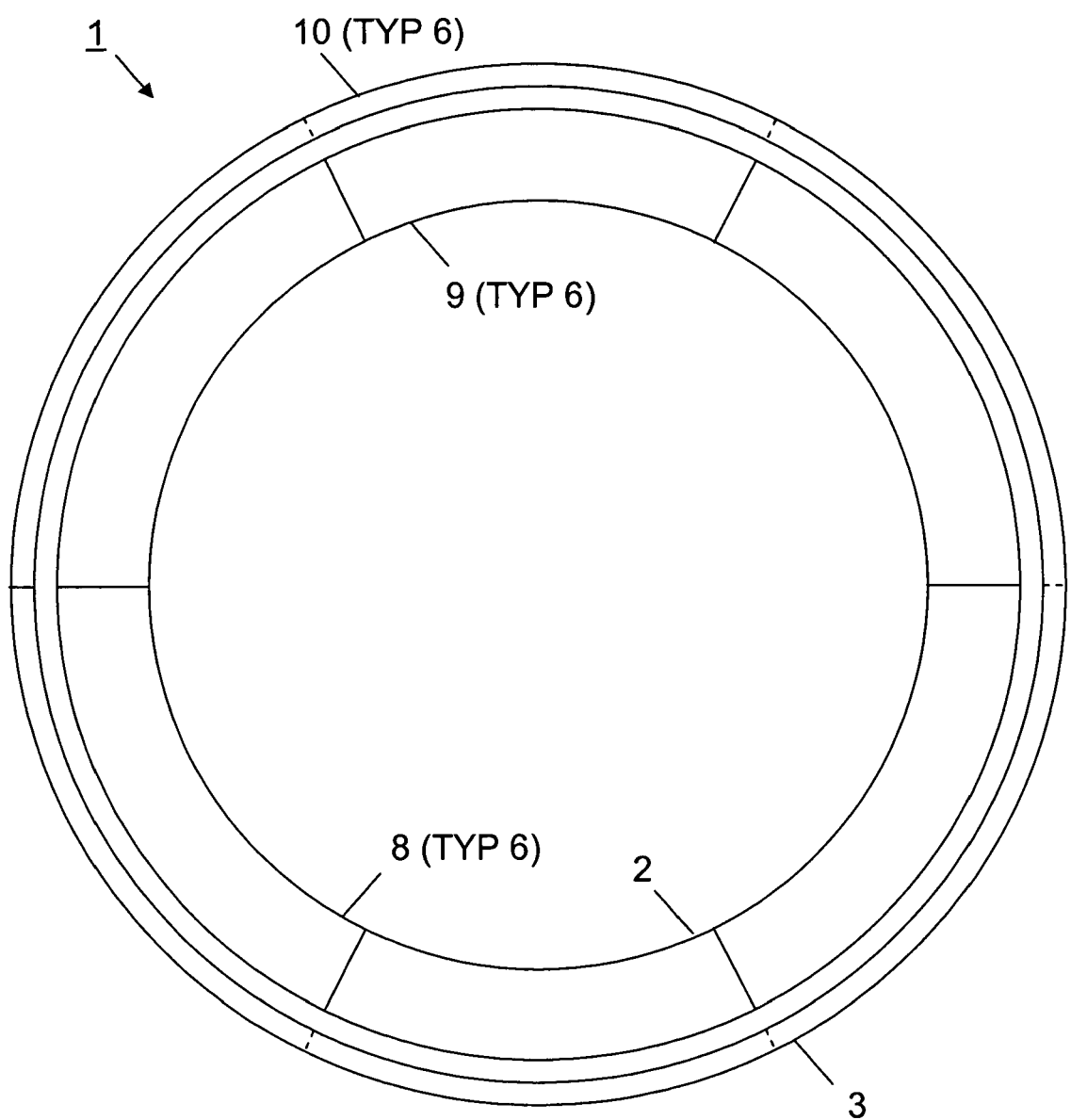
FIG. 8 illustrates yet still another exemplary embodiment of an electrical machine constructed as a rotary machine.

FIG. 3 illustrates a new electrical machine 1 according to the claimed invention with a total of 48 stator poles 7 and of 20 armature pole pairs 4, 5, the stator pole arrangement of the stator poles 7 having four identical sub-arrangements of stator poles 8. The following chart defines the coil connection scheme for a single sub-arrangement of stator poles 8 with twelve stator poles, which are assigned to five rotor pole pairs. The mechanical angle in this chart is scaled to a quarter, i.e. to the actual mechanical angle, because the sub-arrangement of stator poles 8 is repeated within the complete electrical machine 1 for four times. The numbers of phases listed in the chart below are explained in the chart below by a notation already used here with regard to the phases U, W and V. The design of every single sub-arrangement of stator poles 8 in the electrical machine 1 according to FIG. 3 corresponds to the teaching of DE 195 11 434, also incorporated by reference herein, for a complete electrical machine. Furthermore, the design according to FIG. 3 differs from the design according to FIG. 2 in such a way that the stator 2 is not only divided into sub-arrangements of stator poles 8, but also into mechanical stator segments 9. Every stator segment 9 is characterized by an identical mechanical, electrical and magnetic design. As a result it can be manufactured separately from the other stator segments 9. An electrical connection of the single pole coils of the stator segments 9 with each other has to be made only after the complete assembly of the stator 2.

In summary, a multi pole electrical machine is disclosed herein. The electrical machine includes an armature and a stator. The armature is movable in a direction of armature motion with regard to the stator. The armature includes an integer number of armature pole pairs. The armature pole pairs follow each other in the direction of armature motion, and each of the armature pole pairs corresponds to one magnetic period. The stator may include a fixed number of stator poles per armature pole pair, the number of stator poles per armature pole pair differing from an integer number to reduce a cogging force of the electrical machine. According to the invention, an arrangement of all of the stator poles, with regard to both electrical and magnetic aspects, consists of a least two identical sub-arrangements of the stator poles. The sub-arrangements of stator poles follow each other in the direction of armature motion. Each of the sub-arrangements of stator poles is associated with an integer number of the armature pole pairs. Typically, the sub-arrangement includes more than three of the stator poles.

LIST OF REFERENCE NUMERALS

1—electrical machine
2—stator
3—armature
4—south pole
5—north pole
4, 5—armature pole pair
6—permanent magnet
7—stator pole
8—sub-arrangement of stator poles
9—stator segment
10—armature segment

I claim:

1. A multiple phase electric machine comprising:
at least three stator segments, each segment having:
   M stator poles, wherein M is an integer number equal to or greater than 3;
   a first distance between adjacent stator poles; and
   at least one stator pole for each phase of the multiple phase electric machine, including a first stator pole electrically connected to a first electric phase of the machine, a second stator pole electrically connected to a second phase of the electrical machine, and a third stator pole electrically connected to a third phase of the electrical machine;
a number of rotor segments equal to the number of stator segments, each rotor segment being associated with a unique stator segment and having:
   N permanent magnet rotor poles, wherein N is an integer number greater or less than M, wherein pairs of successive permanent magnet rotor poles define a magnetic period, and wherein the ratio of M to N/2 is a non integer number; and
   a second distance between adjacent permanent magnet rotor poles; wherein the second distance is greater or less than the first distance between adjacent stator poles; and
the stator segments forming a generally circular stator part and
the rotor segments forming a generally circular rotor part wherein the generally circular rotor part is external to the generally circular stator part.

2. The electric machine of claim 1 comprising at least one electrical phase coil that includes first, second, and third windings, wherein the first winding is wound a first direction around a first stator pole, the second winding is wound a second direction around a second stator pole, the second direction being opposite to the first direction, the third winding wound the first direction around a third stator pole, and wherein the second stator pole is adjacent the first and third stator poles.

3. The electric machine of claim 1 wherein M equals twelve and N equals ten and wherein the machine includes four stator segments and four rotor segments such that the total number of stator poles equals 48 and the total number of rotor poles equals 40.

4. The electrical machine of claim 1 wherein three operating phases are associated with the electrical machine, wherein the stator segment is repeated five times, wherein the stator segment includes nine stator poles, and wherein the rotor part includes twenty rotor pole pairs arranged such that eight rotor poles are associated with each stator segment.

5. The electrical machine of claim 1 wherein three operating phases are associated with the electrical machine, wherein the stator segment includes a quantity of stator poles equal to 3(2n+1), where n is an integer number, and wherein 3(2n+1)±1 rotor poles are associated with each stator pole segment.

6. The electrical machine of claim 1 wherein three operating phases are associated with the electrical machine, wherein the stator segment is repeated four times, wherein the stator segment includes twelve stator poles, and wherein the rotor part includes twenty rotor pole pairs arranged such that ten rotor poles are associated with each stator segment.

7. The electrical machine of claim 1 wherein three operating phases are associated with the electrical machine, wherein the stator segment is repeated four times so as to form a generally circular stator assembly, wherein the stator segment includes twelve stator poles, wherein the rotor segment is repeated four times, wherein the rotor segment includes ten armature poles, and wherein each rotor segment is associated with a corresponding stator segment.

8. The electric machine of claim 1 wherein three operating phases are associated with the electrical machine, wherein M is a first integer multiple of six, wherein N is a second integer multiple of five, and wherein values for the first and second integer multiples are the same.

9. An electrical machine comprising
at least three stator segments having first, second, and third phase portions,
each phase portion comprising:
at least three adjacent stator poles having a first distance between each adjacent stator pole, including a first stator pole electrically connected to a first electric phase of the machine, a second stator pole electrically connected to a second phase of the electrical machine, and a third stator pole electrically connected to a third phase of the electrical machine; and
a phase coil wound around the at least three adjacent stator poles, wherein the phase coil comprises:
a first winding having a first direction of winding around a first stator pole;
a second winding having a second direction of winding around a second stator pole adjacent to the first stator pole, the second direction of winding being opposite to the first direction of winding; and
a third winding having the first direction of winding around a third stator pole adjacent to the second stator pole;
a number of rotor segments equal to the number of stator segments each rotor segment being associated with a unique stator segment and having a number of adjacent permanent magnet rotor poles differing from the number of stator poles in the stator segment and a second distance between each adjacent permanent magnet rotor pole, wherein pairs of successive permanent magnet rotor poles define a magnetic period, and wherein the ratio of the number of stator poles per segment to the number of pairs of successive rotor poles is a non integer number and said second distance being different from the first distance between each adjacent stator pole; and
the stator segments form a generally circular stator; and
wherein the rotor segments form a generally circular rotor the rotor comprising a location external to the stator.

10. The electric machine of claim 9 wherein the number of stator poles comprise an integer multiple of the number of operating electrical phases of the electric machine.

11. The electrical machine of claim 9 wherein three operating phases are associated with the electrical machine, wherein the first stator segment is repeated four times, wherein the first stator segment includes twelve stator poles, wherein the first rotor segment is repeated four times, and wherein the first rotor segment includes ten permanent magnet rotor poles.

12. The electrical machine of claim 9 wherein three operating phases are associated with the electrical machine, wherein the first stator segment and first rotor segment are repeated from three to six times, wherein the first stator segment includes a quantity of stator poles equal to a first integer multiple of six, wherein the first rotor segment includes a quantity of permanent magnetic rotor poles equal to a second integer multiple of five, and wherein values for the first and second integer multiples are the same.

* * * * *

UNITED STATES PATENT AND TRADEMARK OFFICE
CERTIFICATE OF CORRECTION

PATENT NO. : 7,321,176 B2
APPLICATION NO. : 10/225469
DATED : January 22, 2008
INVENTOR(S) : Thomas Strothmann It is certified that error appears in the above-identified patent and that said Letters Patent is hereby corrected as shown below:

Title Page, Item 73, Assignee, should read as follows:

"Thomas Strothmann, Wallenhorst, Germany and Invacare Corporation, Elyria, OH, US"

Signed and Sealed this
Third Day of July, 2012

David J. Kappos
*Director of the United States Patent and Trademark Office*